United States Patent Office 3,047,713
Patented July 31, 1962

3,047,713
METHOD OF ARC WELDING ALUMINUM MEMBERS
James A. Liptak, E. 1331 23rd St., Spokane, Wash.
No Drawing. Filed Sept. 13, 1961, Ser. No. 137,740
13 Claims. (Cl. 219—118)

This invention relates to arc welding of aluminum members and, more particularly, to gas shielded metal arc welding of comparatively thick aluminum members.

This invention is particularly applicable to the type of arc welding wherein a bare aluminum filler wire constitutes a consumable electrode and is fed automatically to a welding device, such as a fully automatic welding head. The welding device and the material to be welded move relative to each other so that the terminal portion of the consumable wire electrode follows the seam or portion to be welded and, as the welding operation proceeds, the filler wire electrode is fed automatically into and through the welding device. The filler wire electrode carries the welding current, and an arc is maintained between the terminal portion of the electrode and the piece to be welded. In addition, an inert gas shield is provided to shield the area being welded from the atmosphere. This process, commonly referred to as the inert-gas metal-arc welding process, has found extensive and advantageous use in welding aluminum materials, however, the process, as has been heretofore practiced, has not been economically adaptable to the welding of relatively thick members, e.g., on the order of 3/4 inch and above in thickness. The process as practiced has been a high current density process operating in the range of 50,000 to 100,000 amperes per square inch of filler metal cross-section in order to obtain a molten metal transfer across the arc which is of the spray type. Consequently, the diameter of the filler metal wire has been limited, e.g., on the order of 1/8 inch or less. Welding of relatively thick aluminum members by the process as heretofore practiced results in high cost.

Recently, however, the use of comparatively thick aluminum members such as plate, for example from 3/4 inch up to 3 or 4 inches or more, has had considerable application in armored military vehicles, aircraft carriers, large cryogenic devices, etc., and this in turn has created the need for economical welding procedures to weld aluminum plate in these thicknesses. When attempting to weld thick aluminum plates using a deep groove weld bevel, the weld metal deposition rate is a critical factor in determining welding economy. The weld metal deposition rate is in turn a function of the welding current, thus, increasing the maximum usable welding current normally results in lower welding costs. However, there is a maximum practical current which can be used for a given filler wire electrode size. Consequently, the economy and speed of aluminum welding has been limited by the small diameter aluminum wire which has been previously available. The instant invention provides improvements to the inert-gas metal-arc process which permit relatively thick aluminum members, e.g., on the order of 3/4 inch thickness and above, to be joined by sound and economical welds. In the instant invention aluminum filler wires having diameters between 5/32 inch and 1/4 inch are used in the welding procedure along with higher deposition rates through the use of comparatively low current densities and an unstable, crackling arc to give economical, excellent quality welds with aluminum members considerably thicker than has been heretofore practical.

The prior method of welding using the 1/8 inch or smaller filler wire involved current densities generally in excess of 50,000 ampers per square inch of filler wire electrode cross-section. The length of the arc, the voltage, the current density, etc., were all adjusted in order to provide the transfer of metal from the wire electrode to the work piece in the form of a fine spray of metal which gave a characteristic hissing sound. In contrast, the subject invention uses comparatively low current densities of between 12,000 and 35,000 amperes per square inch, and a number of factors, as will be described in more detail below, are adjusted in order to provide a comparatively short arc such that the metal transfer across the arc is in comparatively large droplets, which is known as globular transfer, and which, when properly adjusted, makes a sharp crackling or snapping sound. The use of the instant process results in metal deposition rates considerably higher than available with the prior art, with a range extending from approximately 8 pounds of aluminum per hour to over 22 pounds per hour. The prior art inert-gas metal-arc deposition rates for aluminum ranged from 5 to 10 pounds per hour.

In the practice of the instant invention, there are a considerable number of variables which must be controlled between certain limits in order to provide satisfactory results. After considerable investigation, experimentation and research, as evidenced in part by the tables incorporated in the subject application, the following pertinent information for successfully welding relatively thick aluminum members has been developed.

In order to obtain satisfactory welds of thick aluminum members, the power supply must provide constant energy, and the wire must be fed by a suitable variable feed arrangement wherein the rate of wire feed is adjusted or changed in response to changes or variations in arc length. In the variable wire feed system the feed motors are generally shunt-wound D.C. motors of higher horsepower than the motors used with constant feed arrangements. Variations in the torque load are compensated for by the inherent low speed regulation of this type of motor. If the rate of burn-off of the metal electrode changes, the self-regulating effect of the power supply compensates therefor. In the variable wire feed system the wire feed motor armature can be connected across the welding arc, and therefore changes in the arc voltage are reflected as power changes to the wire feed motor and tend to adjust its speed to restore proper arc length. In the course of the investigation, it was determined that welding operations having a current density in excess of some 40–50,000 amperes per square inch of electrode cross-section were sufficiently self-regulating to allow the use of a constant feed control. However, as the welding process of the subject invention is carried out in a current density range of from about 12,000 to about 35,000 amperes per square inch of electrode cross-section, the variable wire feed control system was found to be necessary in order to provide satisfactory control.

It was found that when butt welds of thick plates using comparatively large diameter filler wire were attempted, using the comparatively long, normal spray-type arc, the welds were unsatisfactory in that there was a lack of fusion to the side walls of the weld. This apparently was due to an undesirable weld bead shape which had a deep papillary penetration pattern. It was found that using the low current density, low voltage, globular transfer, short crackling arc of this invention that while there was less penetration in the central area of the papillary, there was more penetration at the side walls, which resulted in proper fusion.

In general, the most common measure of a length of an arc is by means of the arc voltage, with higher arc voltage indicating longer arcs. However, there is a wide variation in the connection of volt meters on commercial equipment, and, because of these differences and variations in the length of welding cables, ground leads, watercooled cables, etc., the true arc voltage does not necessarily appear on the meters. Thus, in practice, the arc voltage observed on commercial equipment frequently has to be adjusted to compensate for various IR drops. Frequently these IR drops are unknown, and thus the true arc voltages are, practically speaking, rarely measured. However, in the subject invention it is found that the arc can be satisfactorily judged by its sound. The long prior art arc has a hissing sound, while the short arc suitable for use in the subject invention has a sharp, crackling or popping sound. It is found that, if the operator shortens the arc having the characteristic hissing of the prior art, the hissing sound disappears quite suddenly and is replaced with the sharp, crackling sound, and, if the other variables are properly controlled, excellent weld results are obtained.

In addition, it is found that lack of fusion also occurs when the travel speed of the arc is increased to a point where the arc is allowed to impinge on solid metal which is to be welded. However, if the arc is allowed to impinge only on molten metal, satisfactory fusion is obtained. Thus the travel speed of the arc should always be slow enough to permit the arc to impinge only on the molten metal.

The use of argon as the inert shielding gas generally provides satisfactory welds. However, it is found that, although the shape of the welding groove affects the tendency toward lack of fusion to the side walls, the fusion may be somewhat controlled by the particular inert gas used in the gas shield. In general, deep, narrow, U-shaped grooves are more susceptible to lack of fusion defects than are V-shaped grooves. In fact, it is found that if a U-type groove is desired, argon alone should not be used for the shielding gas. If helium is added to the argon inert shielding gas, as helium has a higher ionization potential than argon, a higher arc voltage for a given arc length results which thereby increases the heat input from the short arc. Thus when it is desired to use U-type grooves, particularly on materials over 2 inches thick, it is found that the additional heat input of a mixture of 75% helium and 25% argon for the shielding gas provides proper fusion to the side walls of the welding groove.

In addition, it is found that, in cases in which the appearance of the weld bead is a factor, the use of argon as a shielding gas with the short, crackling arc technique of the subject invention results in a somewhat rippled appearance to the weld bead. Here, too, the addition of helium, normally in amounts of approximately 10% helium with 90% argon, increases the heat input sufficiently to give a greatly improved appearance to the weld bead.

Another advantage of increasing the heat input by the addition of helium is that, when desired, additional penetration can be obtained. When this additional penetration is desired, it is found that a mixture of approximately 25% helium with 75% argon gives excellent results. It is also found that a 75% helium, 25% argon shielding gas mixture is very useful in welds in which severe misalignment is likely to occur. Even when the beads on opposite sides of the members to be welded are badly misaligned, excellent fusion is still obtained in using the shielding gas mixture mentioned.

The results of a number of tests are given in Tables I and II with the composition of the aluminum members involved being given in Table III.

*Table I*

| Butt welds, plate thickness, inches | Filler diameter, inches | Inert gas | Current, amperes | Voltage, volts | Travel, inches per minute | Pass location |
|---|---|---|---|---|---|---|
| ¾ | 5/32 | Argon | 450 | 28 | 16 | 1st side. |
|  | 5/32 | ----do---- | 500 | 28 | 16 | 2nd side. |
| ¾ | 3/16 | ----do---- | 490 | 32 | 15 | 1st side. |
|  | 3/16 | ----do---- | 500 | 32 | 15 | 2nd side. |
| 1 | 5/32 | ----do---- | 450 | 28 | 10 | 1st side. |
|  | 5/32 | ----do---- | 500 | 28 | 10 | 2nd side. |
| 1 | 3/16 | ----do---- | 500 | 26.5 | 12 | 1st side. |
|  | 3/16 | ----do---- | 500 | 26.5 | 12 | 2nd side. |
| 1¼ | 3/16 | ----do---- | 550 | 26.5 | 10 | 1st side. |
|  | 3/16 | ----do---- | 550 | 26.5 | 10 | 2nd side. |
| 1¼ | 5/32 | ----do---- | 500 | 25 | 10 | 1st side. |
|  | 5/32 | ----do---- | 500 | 27 | 10 | Do. |
|  | 5/32 | ----do---- | 500 | 26 | 12 | 2nd side. |
| 1 5/16 | 3/16 | ----do---- | 550 | 29 | 8 | 1st side. |
|  | 3/16 | ----do---- | 575 | 29 | 8 | 2nd side. |
| 1½ | 7/32 | ----do---- | 650 | 27 | 8 | 1st side. |
|  | 7/32 | ----do---- | 675 | 27.5 | 8 | 2nd side. |
| 1½ | 3/16 | ----do---- | 550 | 26 | 10 | 1st side. |
|  | 3/16 | ----do---- | 575 | 27 | 10 | 2nd side. |
|  | 3/16 | ----do---- | 600 | 29 | 10 | 1st side. |
|  | 3/16 | ----do---- | 600 | 29 | 10 | 2nd side. |
| 1¾ | 3/16 | ----do---- | 600 | 28 | 10 | 1st side. |
|  | 3/16 | ----do---- | 600 | 28 | 10 | 2nd side. |
|  | 3/16 | ----do---- | 500 | 27 | 14 | 1st side. |
|  | 3/16 | ----do---- | 500 | 27 | 14 | Do. |
|  | 3/16 | ----do---- | 500 | 27 | 14 | 2nd side. |
|  | 3/16 | ----do---- | 500 | 27 | 14 | Do. |
| 1¾ | 7/32 | ----do---- | 650 | 26 | 10 | 1st side. |
|  | 7/32 | ----do---- | 650 | 26 | 10 | 2nd side. |
|  | 7/32 | ----do---- | 600 | 27 | 10 | 1st side. |
|  | 7/32 | ----do---- | 600 | 27 | 10 | 2nd side. |
| 1¾ | 3/16 | ----do---- | 600 | 28 | 10 | 1st side. |
|  | 3/16 | ----do---- | 600 | 28 | 10 | Do. |
|  | 3/16 | ----do---- | 550 | 30 | 14 | Do. |
|  | 3/16 | ----do---- | 550 | 30 | 14 | Do. |
|  | 3/16 | ----do---- | 550 | 30 | 10 | 2nd side. |
| 2 | 7/32 | ----do---- | 600 | 26 | 10 | 1st side. |
|  | 7/32 | ----do---- | 600 | 28 | 10 | 2nd side. |
|  | 7/32 | ----do---- | 600 | 30 | 10 | 1st side. |
|  | 7/32 | ----do---- | 600 | 30 | 10 | 2nd side. |
| 2 | 3/16 | ----do---- | 600 | 28 | 10 | 1st side. |
|  | 3/16 | ----do---- | 600 | 28 | 10 | Do. |
|  | 3/16 | ----do---- | 500 | 26 | 14 | 1st side.[1] |
|  | 3/16 | ----do---- | 550 | 28 | 10 | 2nd side. |
| 3 | 3/16 | 25% He, 75% A | 600 | 25 | 9 | 1st side. |
|  | 3/16 | ----do---- | 600 | 25 | 9 | 2nd side. |
|  | 3/16 | ----do---- | 500 | 23 | 11 | 1st side. |
|  | 3/16 | ----do---- | 500 | 23 | 11 | 2nd side. |
|  | 3/16 | ----do---- | 625 | 26 | 9 | 1st side. |
|  | 3/16 | ----do---- | 625 | 26 | 9 | 2nd side. |

*Table I—Continued*

| Butt welds, plate thickness, inches | Filler diameter, inches | Inert gas | Current, amperes | Voltage, volts | Travel, inches per minute | Pass location |
|---|---|---|---|---|---|---|
| | 3/16 | 25% He, 75% A | 600 | 27 | 9 | 1st side. |
| | 3/16 | do | 600 | 27 | 9 | 2nd side. |
| | 3/16 | do | 600 | 27 | 9 | 1st side. |
| | 3/16 | do | 600 | 27 | 9 | 2nd side. |
| | 3/16 | do | 600 | 27 | 9 | 1st side. |
| | 3/16 | do | 600 | 27 | 9 | 2nd side. |
| 3 | 7/32 | do | 650 | 25 | 9 | 1st side. |
| | 7/32 | do | 650 | 25 | 9 | 2nd side. |
| | 7/32 | do | 500 | 23 | 10 | 1st side. |
| | 7/32 | do | 500 | 23 | 10 | 2nd side. |
| | 7/32 | do | 650 | 26 | 9 | 1st side. |
| | 7/32 | do | 650 | 26 | 9 | 2nd side. |
| | 7/32 | do | 625 | 27 | 9 | 1st side. |
| | 7/32 | do | 625 | 27 | 9 | 2nd side. |
| | 7/32 | do | 625 | 27 | 9 | 1st side. |
| | 7/32 | do | 625 | 27 | 9 | 2nd side. |

| Fillet welds, fillet size, inches | | | | | | Pass number |
|---|---|---|---|---|---|---|
| 1/2 | 5/32 | Argon | 525 | 22 | 12 | Single pass. |
| 5/8 | 5/32 | do | 525 | 22 | 10 | Do. |
| 3/4 | 5/32 | do | 600 | 25 | 10 | Do. |
| 1 | 5/32 | do | 600 | 25 | 12 | 1st pass. |
| | 5/32 | do | 555 | 24 | 10 | 2nd pass. |
| | 5/32 | do | 555 | 24 | 10 | 3rd pass. |
| 1 1/4 | 5/32 | do | 600 | 25 | 10 | 1st pass. |
| | 5/32 | do | 600 | 25 | 10 | 2nd pass. |
| | 5/32 | do | 600 | 25 | 10 | 3rd pass. |
| 1/2 | 3/16 | do | 550 | 25 | 12 | Single pass. |
| 3/4 | 3/16 | do | 625 | 27 | 8 | Do. |
| 1 | 3/16 | do | 625 | 27 | 8 | 1st pass. |
| | 3/16 | do | 550 | 28 | 12 | 2nd pass. |
| | 3/16 | do | 550 | 28 | 12 | 3rd pass. |
| 1 1/4 | 3/16 | do | 625 | 27 | 8 | 1st pass. |
| | 3/16 | do | 600 | 28 | 10 | 2nd pass. |
| | 3/16 | do | 600 | 28 | 10 | 3rd pass. |
| 3/4 | 7/32 | do | 625 | 22 | 8 | Single pass. |
| 1 | 7/32 | do | 675 | 23 | 6 | Do. |
| 1 1/4 | 7/32 | do | 625 | 22 | 8 | 1st pass. |
| | 7/32 | do | 625 | 22 | 10 | 2nd pass. |
| | 7/32 | do | 625 | 22 | 10 | 3rd pass. |
| 1 1/2 | 7/32 | do | 650 | 23 | 6 | 1st pass. |
| | 7/32 | do | 650 | 23 | 10 | 2nd pass. |
| | 7/32 | do | 650 | 23 | 10 | 3rd pass. |
| | 7/32 | do | 650 | 23 | 10 | 4th pass. |

[1] Four more identical passes.

*Table II*

| Material | | Technique | Inert gas | Average transverse properties | | |
|---|---|---|---|---|---|---|
| Plate 5083, plate thickness, inches | Filler 5183, filler diameter, inches | | | Ultimate tensile strength, p.s.i. | Yield strength, p.s.i. | Percent elong. in 2 in. |
| 13/16 | 5/32 | 2 pass | Argon | 41,350 | 19,600 | 18.7 |
| | 3/16 | do | do | 41,500 | 20,400 | 17.3 |
| | 7/32 | do | do | 41,350 | 18,900 | 18.9 |
| 13/16 | 5/32 | do | 10% He, 90% A | 42,100 | 19,600 | 21.8 |
| | 3/16 | do | do | 41,400 | 19,900 | 18.0 |
| | 7/32 | do | do | 40,500 | 22,600 | 13.0 |
| 13/16 | 5/32 | do | 25% He, 75% A | 41,400 | 18,900 | 21.8 |
| | 3/16 | do | do | 41,600 | 19,300 | 22.7 |
| | 7/32 | do | do | 41,300 | 19,400 | 22.1 |
| 13/16 | 5/32 | do | 75% He, 25% A | 42,100 | 18,600 | 20.4 |
| | 3/16 | do | do | 41,500 | 18,800 | 24.1 |
| | 7/32 | do | do | 41,200 | 21,800 | 19.4 |
| 3 | 5/32 | Multi-pass | Argon | 40,800 | 19,600 | 21.7 |
| | 3/16 | do | do | 40,900 | 19,500 | 21.2 |
| | 7/32 | do | do | 41,750 | 21,700 | 20.6 |
| 3 | 5/32 | do | 10% He, 90% A | 40,500 | 19,400 | 21.1 |
| | 3/16 | do | do | 40,800 | 19,300 | 22.1 |
| | 7/32 | do | do | 40,300 | 19,900 | 19.9 |
| 3 | 5/32 | do | 25% He, 75% A | 40,800 | 19,600 | 21.2 |
| | 3/16 | do | do | 40,600 | 19,700 | 22.2 |
| | 7/32 | do | do | 41,700 | 21,200 | 18.3 |
| 3 | 5/32 | do | 75% He, 25% A | 41,400 | 21,500 | 21.4 |
| | 3/16 | do | do | 41,400 | 21,200 | 21.0 |
| | 7/32 | do | do | | | |

| Plate 5456, plate thickness, inches | Filler 5556, filler diameter, inches | | | | | |
|---|---|---|---|---|---|---|
| 13/16 | 5/32 | 2 pass | Argon | 42,300 | 20,700 | 16.1 |
| | 3/16 | do | do | 42,800 | 21,000 | 17.8 |

Table II—Continued

| Material | | Technique | Inert gas | Average transverse properties | | |
|---|---|---|---|---|---|---|
| Plate 5456, plate thickness, inches | Filler 5556, filler diameter, inches | | | Ultimate tensile strength, p.s.i. | Yield strength, p.s.i. | Percent elong. in 2 in. |
| 1³⁄₁₆ | ⁷⁄₃₂ | 2 pass | Argon | 42,300 | 19,800 | 17.5 |
| 1³⁄₁₆ | ⁵⁄₃₂ | do | 10% He, 90% A | 42,100 | 20,900 | 16.0 |
| | ³⁄₁₆ | do | do | 43,000 | 20,700 | 20.2 |
| | ⁷⁄₃₂ | do | do | 43,000 | 20,700 | 19.1 |
| 1³⁄₁₆ | ⁵⁄₃₂ | do | 25% He, 75% A | 42,700 | 20,800 | 17.8 |
| | ³⁄₁₆ | do | do | 43,100 | 20,800 | 20.1 |
| | ⁷⁄₃₂ | do | do | 42,800 | 20,700 | 20.2 |
| 1³⁄₁₆ | ⁵⁄₃₂ | do | 75% He, 25% A | 42,700 | 20,600 | 20.1 |
| | ³⁄₁₆ | do | do | 42,500 | 19,900 | 22.5 |
| | ⁷⁄₃₂ | do | do | 42,400 | 19,900 | 21.4 |
| 3 | ⁵⁄₃₂ | Multi-pass | Argon | 43,000 | 21,900 | 20.0 |
| | ³⁄₁₆ | do | do | 42,400 | 20,700 | 20.9 |
| | ⁷⁄₃₂ | do | do | 42,000 | 21,200 | 21.0 |
| 3 | ⁵⁄₃₂ | do | 10% He, 90% A | 42,900 | 21,900 | 20.0 |
| | ³⁄₁₆ | do | do | 42,400 | 21,200 | 22.8 |
| | ⁷⁄₃₂ | do | do | 42,300 | 20,800 | 21.6 |
| 3 | ⁵⁄₃₂ | do | 25% He, 75% A | 43,100 | 21,400 | 20.9 |
| | ³⁄₁₆ | do | do | 42,300 | 20,800 | 21.2 |
| | ⁷⁄₃₂ | do | do | 42,300 | 21,000 | 22.7 |
| 3 | ⁷⁄₃₂ | do | 75% He, 25% A | 42,400 | 20,200 | 22.3 |
| Plate EC, plate thickness, inches | Filler 1100, filler diameter, inches | | | | | |
| 1¼ | ⁵⁄₃₂ | 2 pass | Argon | 10,700 | 4,800 | 67.3 |
| | ³⁄₁₆ | do | do | 10,800 | 4,500 | 61.5 |
| | ⁷⁄₃₂ | do | do | 10,400 | 4,350 | 62.5 |
| 1¼ | ⁵⁄₃₂ | do | 75% He, 25% A | 10,750 | 4,550 | 69.0 |
| | ³⁄₁₆ | do | do | 11,000 | 4,450 | 61.5 |
| | ⁷⁄₃₂ | do | do | 10,600 | 4,400 | 66.7 |

Table III

| Designation | Silicon | Iron | Copper | Manganese | Magnesium | Chromium | Zinc | Titanium | Others Each | Others Total | Aluminum |
|---|---|---|---|---|---|---|---|---|---|---|---|
| 1100 | 1.0 Si+Fe | | 0.20 | 0.05 | | | 0.10 | | 0.05 | 0.15 | 99.00 |
| 5083 | 0.40 | 0.40 | 0.10 | 0.30–1.0 | 4.0–4.9 | 0.05–0.25 | 0.25 | 0.15 | 0.05 | 0.15 | Remainder |
| 5183 | 0.40 | 0.40 | 0.10 | 0.50–1.0 | 4.3–5.2 | 0.05–0.25 | 0.25 | 0.15 | 0.05 | 0.15 | Remainder |
| 5456 | 0.40 Si+Fe | | 0.10 | 0.50–1.0 | 4.7–5.5 | 0.05–0.20 | 0.25 | 0.20 | 0.05 | 0.15 | Remainder |
| 5556 | 0.40 Si+Fe | | 0.10 | 0.50–1.0 | 4.7–5.5 | 0.05–0.20 | 0.25 | 0.05–0.20 | 0.05 | 0.15 | Remainder |
| EC | | | | | | | | | | | 99.45 |

In the tables the composition of the aluminum members and electrodes is indicated by the designations approved by the Aluminum Association, 470 Lexington Avenue, New York 17, New York, with Table III setting forth the compositions of these materials in maximum percentages.

In Table I the plates were made of alloy 5083 with the filler wire electrode being made of alloy 5183. Each group of figures represents a complete weld involving at least one pass on each of the two sides of the plate members. The passes are indicated in the order of their occurrence. The voltages indicated are true arc voltages measured from the contact tube to the test plate.

Table II represents a summary of mechanical properties test results.

In general a two-pass welding technique was used for plates up to 1½ inch thick with a multi-pass technique used for plates over 1½ inch thick. Results of these and other tests indicate that in order to obtain satisfactory welding with aluminum, the current density must be between about 12,000 and about 35,000 amperes per square inch of filler wire electrode cross-section. The arc voltage must be maintained between about 20 volts and about 35 volts. The arc current must be maintained between about 400 amperes and about 800 amperes. The diameter of the filler wire electrode must be between about ⁵⁄₃₂ inch and about ¼ inch. The rate of metal deposition is between about 8 and about 22 pounds per hour. The composition of the inert shielding gas must consist essentially of argon or helium or mixtures thereof. With these conditions it is found that aluminum members having a thickness of at least ¾ inch can be satisfactorily welded. Butt welds can be used to join plates having thicknesses of 3 and 4 inches and more.

Plates welded in accordance with this invention have been found to meet the requirements of the American Society of Mechanical Engineers' Boiler and Pressure Vessel Code, 1959 Edition, Section IX. The results of these tests indicate that the ultimate tensile strength values are approximately 1000 to 1500 pounds per square inch less than those commonly obtained for weldments made with conventional gas metal arc welding. This is to be expected because of the higher heat input and the resulting slower weld metal cooling rates. However, in no case did the transverse tensile strength drop below the guaranteed minimum properties specified for the "0" temper of the material being welded. However, with this slight drop in tensile strength there was an increase in the transverse elongation, as the higher heat inputs resulted in a wider heat-affected zone allowing this zone to elongate more under test. This is illustrated by the fact that all alloy plates made of 5456 alloy which were welded with 5556 alloy filler were able to pass the standard ASME 2T bend test rather than the larger 3⅓ T bend radius presently allowed under the code for this material. Thus, since the tensile strength of the weldments do not drop below the guaranteed properties for the "0" temper of the material involved, aluminum pressure vessel designs will not be penalized and the increased ductility should be favorably viewed in many instances.

As used in this application the term "aluminum" is meant to cover high purity aluminum, commercial purity aluminum and aluminum alloys.

What is claimed is:

1. A method for arc welding of aluminum members having a thickness of at least about ¾ inch wherein an arc is established between said aluminum members and the terminal portion of a consumable aluminum filler metal wire electrode which is continuously fed into said arc and wherein an inert gaseous medium shields said arc, said method comprising the steps of supplying, under an arc voltage, an arc welding current to the terminal portion of said electrode, maintaining the current density of said current between about 12,000 and about 35,000 amperes per square inch of filler metal wire electrode cross-section, maintaining said terminal portion of said electrode in a spaced relationship with said aluminum members during welding operation, and (1) correlating
 (a) said arc voltage and
 (b) said arc current with
  (i) said spaced relationship and with
  (ii) the rate of metal deposition and
(2) adjusting the rate of wire feed in response to variations in arc length in order to maintain and insure
(A) globular transfer of metal from said wire electrode to said aluminum members and
(B) an unstable arc having
 (I) a crackling sound and
 (II) a short length.

2. The method of claim 1, wherein the diameter of said wire electrode is between about 5/32 inch and about ¼ inch.

3. The method of claim 1, including the step of maintaining said arc current between about 400 amperes and about 800 amperes.

4. The method of claim 1, including the step of maintaining said arc voltage between about 20 volts and about 35 volts.

5. The method of claim 1, including the step of maintaining the rate of metal deposition between about 8 and about 22 pounds per hour.

6. The method of claim 1, including the step of maintaining said arc in a position such that in welding operation it impinges only upon a molten metal puddle on said aluminum members.

7. The method of claim 6, wherein the diameter of said wire electrode is between about 5/32 inch and about ¼ inch.

8. A method for arc welding of aluminum members having a thickness of at least about ¾ inch wherein an arc is established between said aluminum members and a terminal portion of a consumable aluminum filler metal wire electrode, which is continuously fed into said arc, said method comprising the steps of providing a consumable aluminum filler metal wire electrode having a diameter between about 5/32 inch and about ¼ inch, supplying, under an arc voltage, an arc welding current to the terminal portion of said electrode, maintaining the current density of said current between about 12,000 and about 35,000 amperes per square inch of filler metal wire electrode cross-section, maintaining said terminal portion of said electrode in a spaced relationship with said aluminum members during welding operation, maintaining said arc in a position such that in welding operation said arc impinges only upon a molten metal puddle on said aluminum members, and (1) correlating
 (a) said arc voltage and
 (b) said arc current with
  (i) said spaced relationship and with
  (ii) the rate of metal deposition and
(2) adjusting the rate of wire feed in response to variations in arc length in order to maintain and insure
(A) globular transfer of metal from said wire electrode to said aluminum members and
(B) an unstable arc having
 (I) a crackling sound and
 (II) a short length.

9. The method of claim 8, including the step of maintaining said arc current between about 400 amperes and about 800 amperes.

10. A method for arc welding of aluminum members having a thickness of at least about ¾ inch wherein an arc is established between said aluminum members and a terminal portion of a consumable aluminum filler metal wire electrode, which is continuously fed into said arc, said method comprising the steps of providing a consumable aluminum filler metal wire electrode having a diameter between about 5/32 inch and about ¼ inch, supplying, under an arc voltage, an arc welding current to the terminal portion of said electrode, maintaining the current density of said current between about 12,000 and about 35,000 amperes per square inch of filler metal wire electrode cross-section, maintaining said arc current between about 400 amperes and about 800 amperes, maintaining said terminal portion of said electrode in a spaced relationship with said aluminum members during welding operation, maintaining said arc in a position such that in welding operation said arc impinges only upon a molten metal puddle on said aluminum members, and (1) correlating
 (a) said arc voltage and
 (b) said arc current with
  (i) said spaced relationship and with
  (ii) the rate of metal deposition and
(2) adjusting the rate of wire feed in response to variations in arc length in order to maintain and insure
(A) globular transfer of metal from said wire electrode to said aluminum members and
(B) an unstable arc having
 (I) a crackling sound and
 (II) a short length.

11. The method of claim 10, including the step of maintaining the rate of metal deposition between about 8 and about 22 pounds per hour.

12. A method for arc welding of aluminum members, wherein an arc is established between said aluminum members and a terminal portion of a consumable aluminum filler metal wire electrode, which is continuously fed into said arc, said method comprising the steps of providing a plurality of aluminum members to be welded having a thickness of at least about ¾ inch, providing a consumable aluminum filler metal wire electrode having a diameter between about 5/32 inch and about ¼ inch, supplying, under an arc voltage, an arc welding current to the terminal portion of said electrode, shielding said arc with an inert gas consisting essentially of an inert gas selected from the group consisting of argon, helium and mixtures of argon and helium, maintaining the current density of said current between about 12,000 and about 35,000 amperes per square inch of filler metal wire electrode cross-section, maintaining said arc voltage between about 20 and about 35 volts, maintaining said arc current between about 400 amperes and about 800 amperes, maintaining said terminal portion of said electrode in spaced relationship with aluminum members during welding operation, (1) correlating
    (a) said arc voltage and
    (b) said arc current with
        (i) said spaced relationship and with
        (ii) the rate of metal deposition and (2) adjusting the rate of wire feed in response to variations in arc length in order to maintain and insure (A) globular transfer of metal from said wire electrode to said aluminum members and (B) an unstable arc having
    (I) a crackling sound and
    (II) a short length, and maintaining said rate of metal deposition between about 8 and about 22 pounds per hour.

13. A method for arc welding of relatively thick aluminum members wherein an arc is established between said aluminum members and the terminal portion of a consumable aluminum filler metal wire electrode which is continuously fed into said arc and wherein an inert gaseous medium shields said arc, said method comprising the steps of supplying, under an arc voltage, an arc welding current to the terminal portion of said electrode, maintaining the current density of said current between about 12,000 and about 35,000 amperes per square inch of filler metal wire electrode cross-section, maintaining said terminal portion of said electrode in a spaced relationship with said aluminum members during welding operation, and (1) correlating
    (a) said arc voltage and
    (b) said arc current with
        (i) said spaced relationship and with
        (ii) the rate of metal deposition and (2) adjusting the rate of wire feed in response to variations in arc length in order to maintain and insure (A) globular transfer of metal from said wire electrode to said aluminum members and (B) an unstable arc having
    (I) a crackling sound and
    (II) a short length.

References Cited in the file of this patent

UNITED STATES PATENTS

| | | |
|---|---|---|
| 2,504,868 | Muller et al. | Apr. 18, 1950 |
| 2,852,659 | Belz et al. | Sept. 16, 1958 |

FOREIGN PATENTS

| | | |
|---|---|---|
| 659,015 | Great Britain | Oct. 17, 1951 |

UNITED STATES PATENT OFFICE
CERTIFICATE OF CORRECTION

Patent No. 3,047,713                         July 31, 1962

James A. Liptak

It is hereby certified that error appears in the above numbered patent requiring correction and that the said Letters Patent should read as corrected below.

Column 3, line 27, for "shaps" read -- shape --.

Signed and sealed this 25th day of December 1962.

(SEAL)
Attest:

ERNEST W. SWIDER
Attesting Officer

DAVID L. LADD
Commissioner of Patents